(12) United States Patent
Sasaki et al.

(10) Patent No.: US 6,612,744 B2
(45) Date of Patent: Sep. 2, 2003

(54) LOCK STRUCTURE OF SPHERICAL BEARING AND LOCK METHOD THEREOF

(75) Inventors: Gen Sasaki, Miyota-machi (JP); Makoto Fujino, Miyota-machi (JP); Kennosuke Kariya, Miyota-machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/902,097

(22) Filed: Jul. 11, 2001

(65) Prior Publication Data

US 2002/0037117 A1 Mar. 28, 2002

(30) Foreign Application Priority Data

Sep. 26, 2000 (JP) .......................................... 2000-292421

(51) Int. Cl.[7] ............................................... F16C 25/04
(52) U.S. Cl. ........................................ 384/208; 384/210
(58) Field of Search .................. 384/208–210; 29/441.1

(56) References Cited

U.S. PATENT DOCUMENTS

| 3,465,405 A | | 9/1969 | Sullivan | |
|---|---|---|---|---|
| 3,662,462 A | | 5/1972 | Shiflet | |
| 4,614,444 A | * | 9/1986 | Hines et al. | 384/138 |
| 4,687,351 A | * | 8/1987 | Martinie | 384/541 |

FOREIGN PATENT DOCUMENTS

| EP | 0 567 002 A1 | 10/1993 |
|---|---|---|
| EP | 0 903 509 A1 | 3/1999 |

* cited by examiner

Primary Examiner—Christopher P. Schwartz
(74) Attorney, Agent, or Firm—Oliff & Berridge, PLC (57) ABSTRACT

A lock structure of a spherical bearing restrains an outer race from turning relative to a housing with a simple structure. It is provided with protruding portions formed on a periphery of one side of a bearing hole of the housing. A flange is formed on one side of the outer race. Meanwhile notches (engagement portions) are formed in the flange, which are brought into engagement with the protruding portions. An annular V-shaped groove (staking groove) formed in the other side of the outer race is staked. With such a simplified structure, the spherical bearing can be locked to the housing while being restrained from turning relative thereto.

1 Claim, 8 Drawing Sheets

LOCK STRUCTURE OF SPHERICAL BEARING AND LOCK METHOD THEREOF

BACKGROUND OF THE INVENTION

1. Field of the Invention

The invention relates to a lock structure of a spherical bearing and more particularly, to the lock structure of a spherical bearing for restraining an outer race from turning relative to a housing.

2. Description of Related Art

Figure 6:
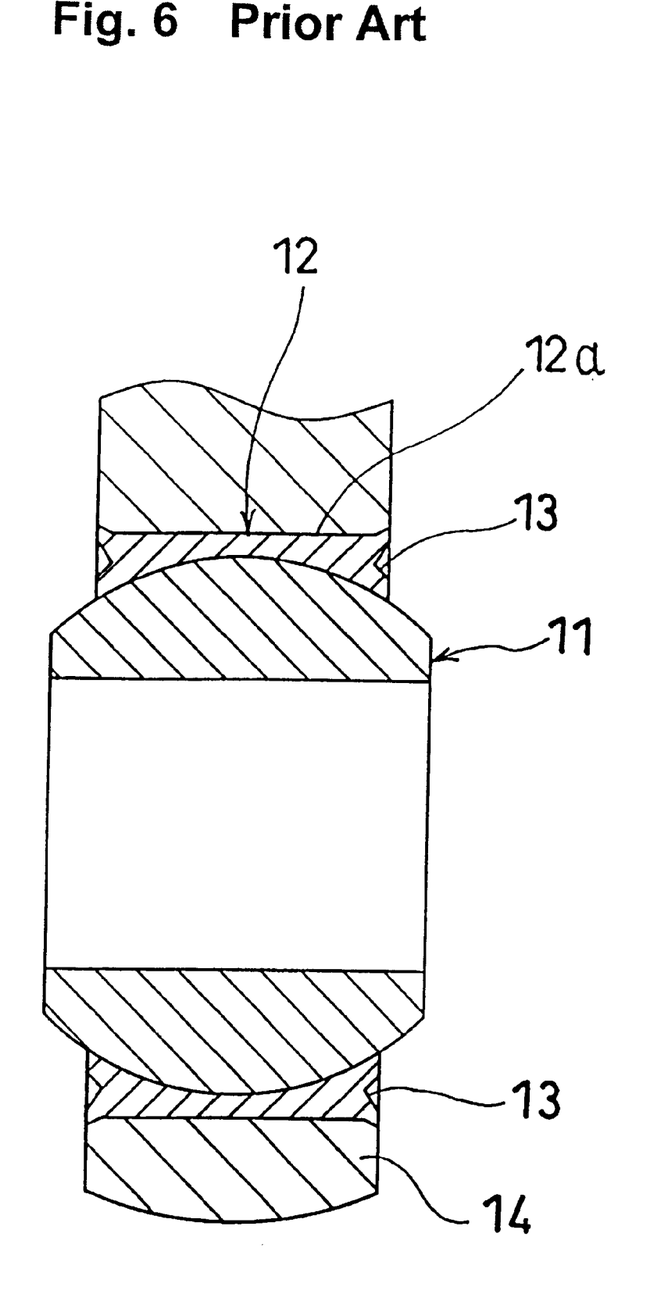
FIG. 6 shows a conventional lock structure of a spherical bearing, particularly, the lock structure in which the spherical bearing is locked to a housing by staking a V-shaped groove formed in each side of an outer race.

Conventionally a spherical bearing in which a spherical surface of an inner race is slidably supported on an inner spherical surface of an outer race has been well known. Such a spherical bearing has been widely employed for a rod end of a link member and the like. FIG. 6 shows an example of a lock structure of a spherical bearing 11. In this lock structure, the spherical bearing 11 is locked to a housing 14 through staking (also referred to as V-staking) for locking an outer race 12 to the housing 14 by staking a V-shaped groove 13 as an annular staking groove formed in each side of the outer race 12 using a dedicated tool (not shown). This makes it possible to easily lock the spherical bearing 11, and be widely used for various applications.

In a case of an eccentric spherical bearing 21, a large rotatiing torque is exerted to the bearing. In the state where the bearing is locked only through staking, the outer race 12 may turn relative to the housing 14, which may cause the risk of wearing an outer peripheral surface 12a of the outer race 12. It is, thus, necessary to restrain the turn of the outer race 12 relative to the housing 14. In order to solve the above-described problem, referring to FIGS. 7 and 8, a flange 26 is formed on the edge of one side of an outer race 25 and an extending portion 26a is formed by extending a part of the lateral edge of the flange 26 in a radial direction of the outer race 25. Additionally a screw portion 24 is formed on the outer peripheral surface of the other side of the outer race 25. Then the outer race 25 is inserted into a bearing hole 23 to bring the flange 26 into abutment against a housing 22, a lock nut 28 is screwed to be locked to the screw portion 24 of the outer race 25 through a lock washer 27, and a pin 29 is driven into the housing 22 to penetrate through the extending portion 26a of the flange 26. As a result, the spherical bearing 21 is locked to the housing 22 while restraining the outer race 25 from turning relative to the housing 22. The above-identified lock structure for the spherical bearing 21 has been conventionally employed.

The lock structure of the spherical bearing 21 described above requires additional parts for locking the spherical bearing 21 to the housing 22, that is, the lock washer 27, the lock nut 28 and the pin 29, resulting in complicated component control as well as in deteriorated efficiency of assembly. Moreover, the flange 26 of the outer race 25 has to be extended to drive the pin 29, causing increase in the material cost owing to increased size (weight) thereof.

SUMMARY OF THE INVENTION

In view of the foregoing problem, it is an object of the invention to provide a lock structure of a spherical bearing having a simple structure, which is capable of restraining an outer race from turning relative to a housing to simplify the assembly and to reduce the cost, and the lock method thereof.

In order to achieve the above objects, according to a first aspect of the invention, the lock structure of the spherical bearing having a spherical surface of an inner race slidably supported on an inner spherical surface of the outer race which is fitted into a bearing hole of the housing so as to be locked thereto includes a protruding portion formed on a periphery of one side of the bearing hole, a flange formed on one side of the outer race, an engagement portion formed in the flange to be brought into engagement with the protruding portion, and an annular staking groove formed in the other side of the outer race.

With the aforementioned structure, the spherical bearing is fitted into the bearing hole to bring the engagement portion formed in the flange of the outer race into engagement with the protruding portion on the periphery of one side of the bearing hole. Meanwhile the staking groove in the other side of the outer race is staked to lock the spherical bearing to the housing.

In order to achieve the above objects, according to a second aspect of the invention, a method of locking the spherical bearing having the spherical surface of the inner race slidably supported on the inner spherical surface of the outer race which is fitted into the bearing hole of the housing so as to be locked thereto includes the protruding portion formed on a periphery of one side of the bearing hole, the flange formed on one side of the outer race, the engagement portion formed in the flange to be brought into engagement with the protruding portion, and the annular staking groove formed in the other side of the outer race, in which the engagement portion is brought into engagement with the protruding portion and the staking groove is staked so as to restrain the spherical bearing from turning relative to the housing.

With the aforementioned method, the spherical bearing is fitted into the bearing hole to bring the engagement portion formed in the flange of the outer race into engagement with the protruding portion on the periphery of one side of the bearing hole. Meanwhile the staking groove in the other side of the outer race is staked to lock the spherical bearing to the housing by restraining the spherical bearing from turning relative to the housing.

DESCRIPTION OF PREFERRED EMBODIMENTS

Figure 1:
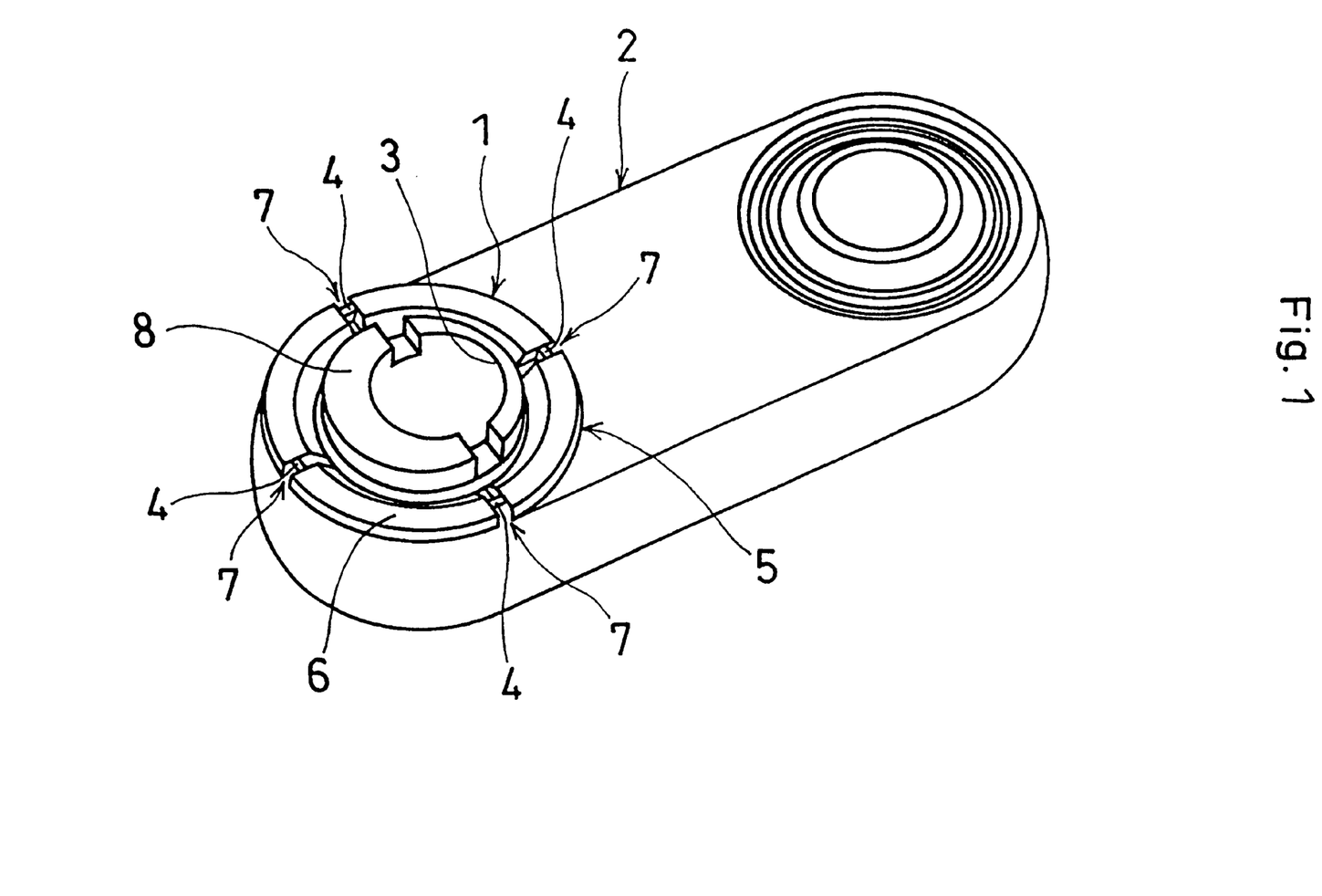
FIG. 1 is a perspective view of a lock structure of a spherical bearing according to an embodiment of the invention.
Figure 2:
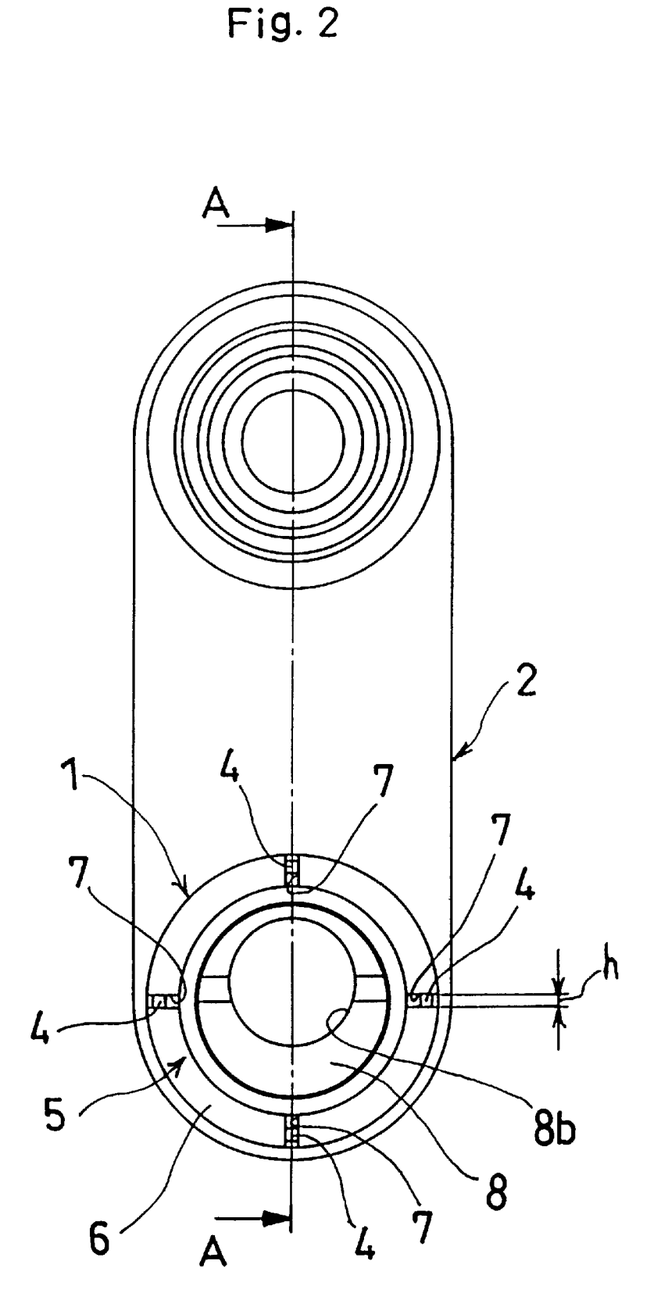
FIG. 2 is a plan view of a lock structure of a spherical bearing according to the embodiment of the invention.
Figure 3:
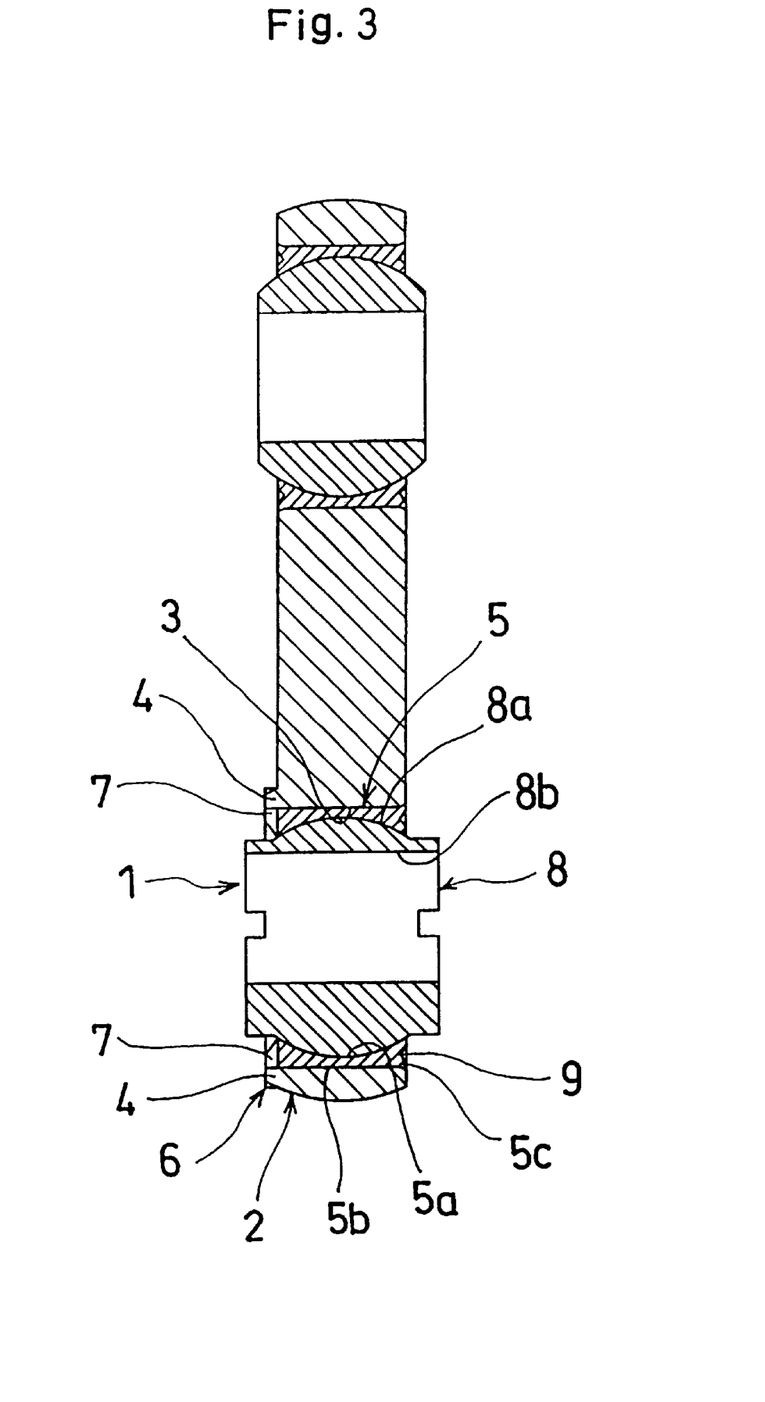
FIG. 3 is a cross-sectional view taken along line A—A of FIG. 2, illustrating the lock structure of the spherical bearing according to the embodiment of the invention.
Figure 4:
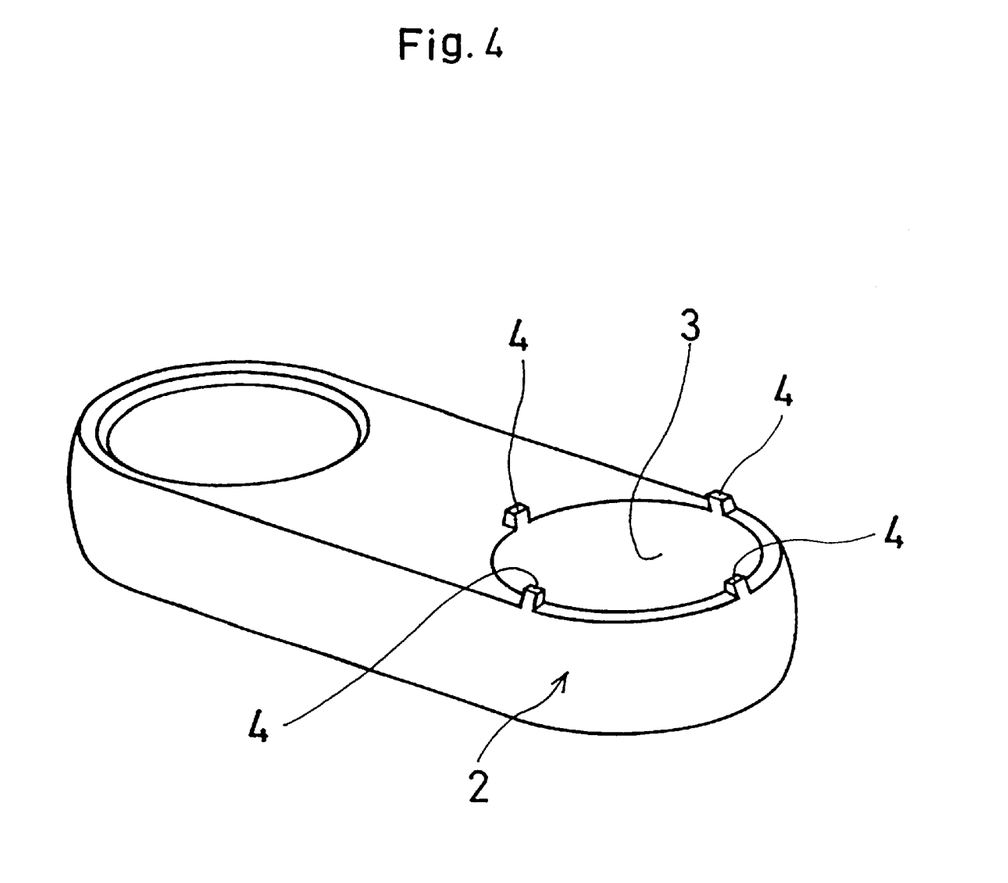
FIG. 4 is a perspective view of a housing of a lock structure of a spherical bearing according to the embodiment of the invention.
Figure 5:
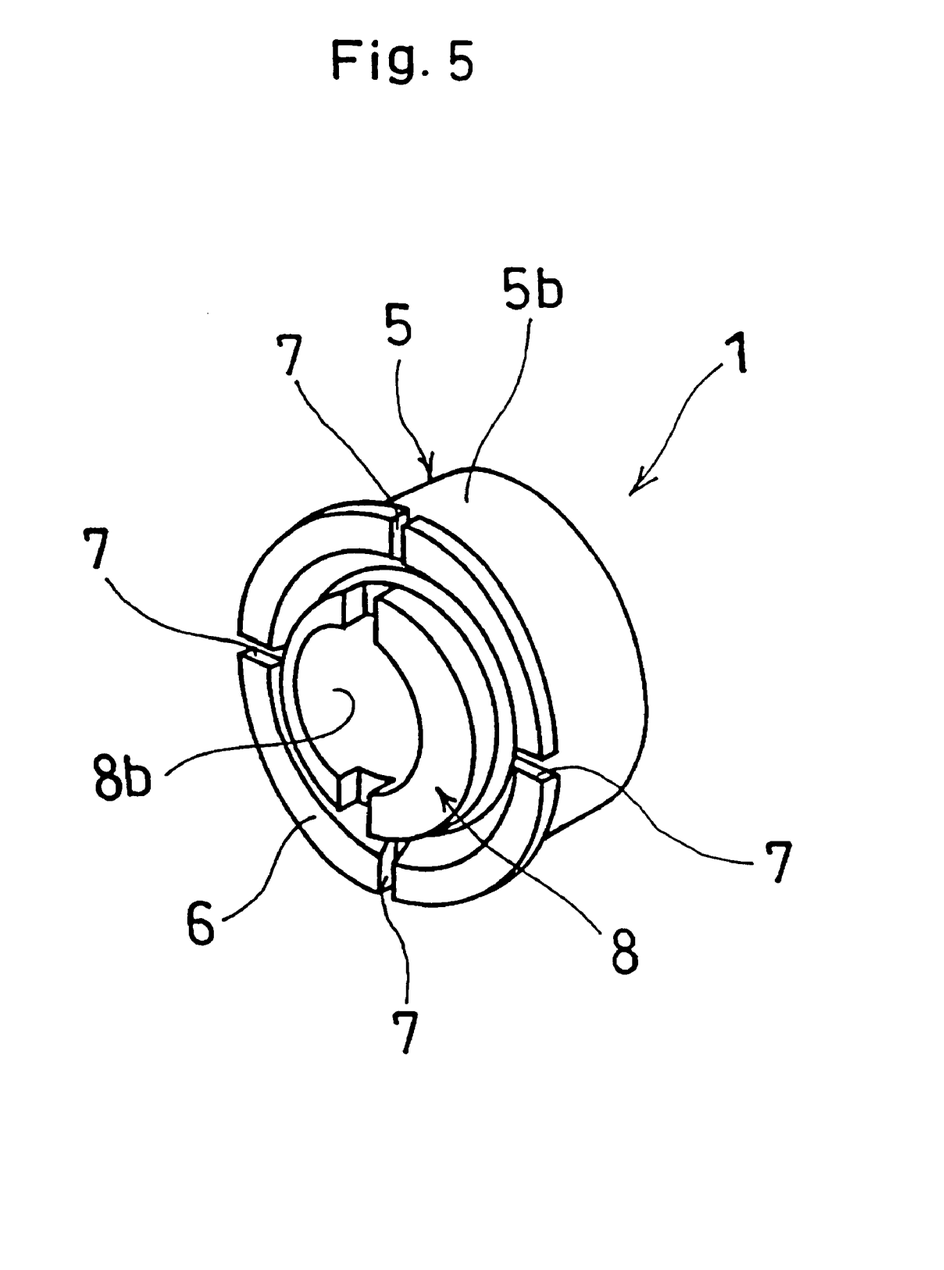
FIG. 5 is a perspective view of a spherical bearing of a lock structure of a spherical bearing according to the embodiment of the invention.

A lock structure of a spherical bearing and a lock method thereof according to an embodiment of the invention will be described with reference to FIGS. 1 to 5. First, the lock structure of the spherical bearing according to the embodiment of the invention will be explained. Referring to FIG. 4, a lock structure of a spherical bearing 1 is provided with a plurality of protruding portions 4 (in this embodiment, four protruding portions) formed on a periphery of one side of a bearing hole 3 of a housing 2 at equal spacing, a flange 6 formed on one side of an outer race 5, and notches 7 formed in the flange 6 as engagement portions to mate with the respective protruding portions 4 as shown in FIG. 5. Referring to FIG. 3, an outer peripheral surface 5b of the outer race 5 is inserted into the bearing hole 3 of the housing 2 to bring the notches 7 of the flange 6 into engagement with the respective protruding portions 4 of the housing 2. A V-shaped groove 9 as an annular staking groove formed in the other side of the outer race 5 is then staked such that the spherical bearing 1 is locked to the housing 2.

Next, the lock structure of the spherical bearing 1 according to this embodiment of the invention will be described in detail. First, the spherical bearing 1 according to this embodiment of the invention will be explained. Referring to FIG. 3, the spherical bearing 1 according to this embodiment of the invention is structured in which a spherical surface 8a of an inner race 8 is rotatably and slidably supported on an inner spherical surface 5a of the outer race 5. An eccentric shaft hole 8b is formed in the inner race 8 so as to allow a shaft member (not shown) to be inserted therethrough. As shown in FIGS. 1 to 3 and FIG. 5, the flange 6 with a predetermined width is provided on the end of one side of the outer race 5. The notches 7 each having a predetermined width (the reference numeral 'h' in FIG. 2) are provided in the flange 6 by notching in the radial direction of the outer race 5. As shown in FIG. 3, the V-shaped groove 9 is formed as the annular staking groove in the other side of the outer race 5. Being staked with a dedicated tool (not shown), the V-shaped groove 9 deforms its outer portion so as to mate with the shape of a chamfered portion 5c formed on the end of the other side of the bearing hole 3.

Next, the structure of the housing 2 according to this embodiment of the invention will be described. As shown in FIG. 4, the bearing hole 3 fitted with the outer peripheral face 5b of the outer race 5 with a predetermined fitting tolerance is formed in the housing 2. A plurality of protruding portions 4 are formed on the periphery of one side of the bearing hole 3 so as to be brought into engagement with the respective notches (engagement portions) 7 of the outer race 5. Referring to FIGS. 1 to 3, in the lock structure of the spherical bearing 1 according to this embodiment of the invention, the outer peripheral face 5b of the outer race 5 is fitted into the bearing hole 3 of the housing 2 and the notches 7 formed in the flange 6 of the outer race 5 are engaged with the respective protruding portions 4 of the housing 2. As a result, the protruding portions 4 serve to restrain the outer race 5 from turning relative to the housing 2. According to the embodiment of the invention, four protruding portions 4 are provided at equal spacing on the periphery of one side of the bearing hole 3 of the housing 2 of the lock structure of the spherical bearing 1. The number of the protruding portions 4 and the arrangement thereof are, however, not limited thereto. They may be determined based on a required rotating torque of the spherical bearing 1 and the like. Furthermore, according to the embodiment of the invention, the spherical bearing 1 has the eccentric shaft hole 8b of the inner race 8. However, it is not limited thereto.

The effect of the lock structure of the spherical bearing 1 and the lock method thereof according to the embodiment of the invention will be described. Referring to FIGS. 1 to 3, the spherical bearing 1 is mounted onto the housing 2 by fitting the outer peripheral face 5b of the outer race 5 of the spherical bearing 1 into the bearing hole 3 of the housing 2 so as to bring the notches 7 as the engagement portions formed in the flange 6 of the outer race 5 into engagement with the respective protruding portions 4 formed on the periphery of one side of the bearing hole 3. Concurrently the flange 6 is brought into abutment against the housing 2. Then as shown in FIG. 3, the V-shaped groove (staking groove) 9 formed in the other side of the outer race 5 is staked with a dedicated tool (not shown) such that the V-shaped groove 9 deforms its outer portion to mate with the shape of the chamfered portion 5c formed on the end of the other side of the bearing hole 3. This structure allows the spherical bearing 1 to the housing 2 by restraining the spherical bearing 1 from turning relative to the housing 2.

According to the lock structure of the spherical bearing 1 and the lock method thereof in the embodiment of the invention, provided are the protruding portions 4 formed on the periphery of one side of the bearing hole 3 of the housing 2, the flange 6 formed on one side of the outer race 5, and the notches 7 (engagement portions) formed in the flange 6 mating with the protruding portions 4, respectively. The outer peripheral face 5b of the outer race 5 of the spherical bearing 1 is fitted into the bearing hole 3 of the housing 2 to bring the notches 7 of the flange 6 into engagement with the respective protruding portions 4. Meanwhile the V-shaped groove 9 as the annular staking groove formed in the other side of the outer race 5 is staked. As a result, the spherical bearing 1 can be locked to the housing 2 with a simple structure yet reliably restraining the spherical bearing 1 from turning relative to the housing 2. Moreover, the respective design of the shape of the flange 6 of the outer race 5 and the shape of the protruding portions 4 of the housing 2 can be made to a substantially high degree of freedom. This makes it possible to easily satisfy requirements for strength or efficiency of process.

Figure 7:
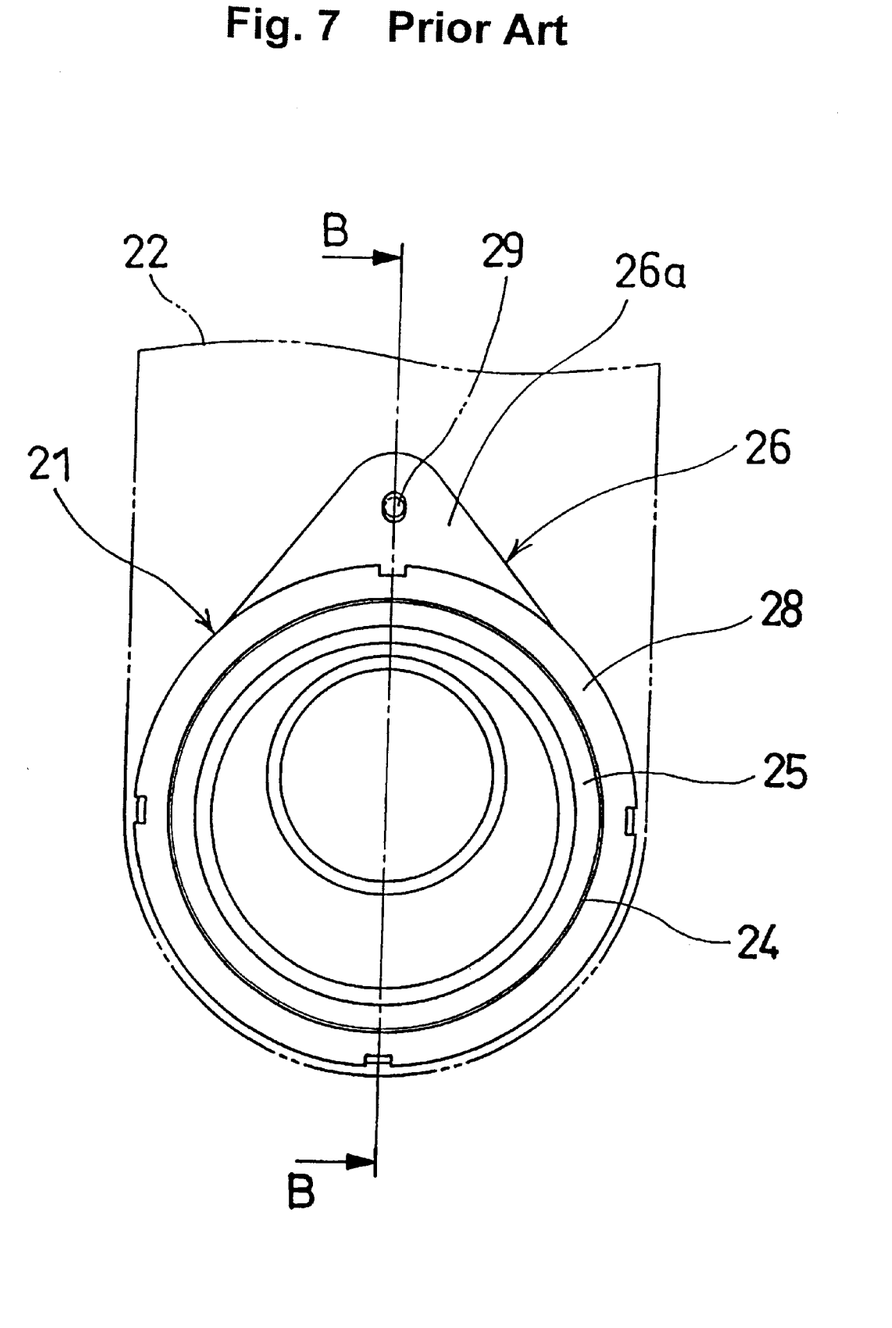
FIG. 7 is a plan view of a lock structure of a spherical bearing as related art, particularly, the lock structure in which a lock nut is tightened while restraining an outer race from turning relative to a housing with a pin.
Figure 8:
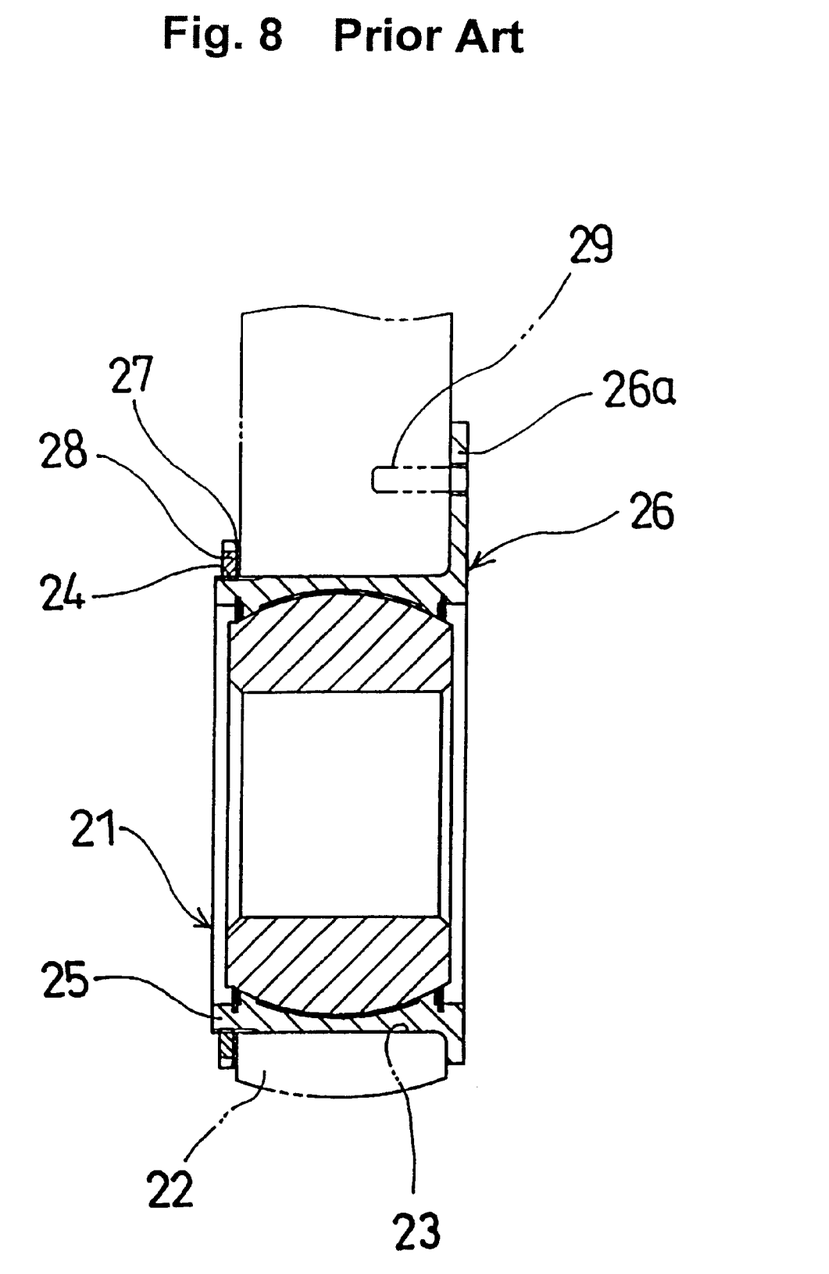
FIG. 8 is a cross-sectional view taken along line B—B of FIG. 7, illustrating the conventional lock structure of the spherical bearing.

Unlike the lock structure of the spherical bearing as related art shown in FIGS. 7 and 8, the present invention requires no components for locking a spherical bearing 21 to a housing 22, for example, a lock washer 27, a lock nut 28, a pin 29 and the like. This makes it possible to realize simplified component control as well as improving efficiency of assembly. Moreover, as the flange 6 of the outer race 5 does not have to be extended in a radial direction for driving the pin 29 thereinto, the size (weight) of material can be reduced, thus greatly reducing the cost.

According to the first aspect of the invention, the lock structure of the spherical bearing 1 is provided with the protruding portions formed on a periphery of one side of a bearing hole of a housing, a flange formed on one side of an outer race, and notches (engagement portions) formed in the flange mating with the respective protruding portions. An outer peripheral surface of the outer race of the spherical bearing is fitted into the bearing hole of the housing to bring the notches of the flange into engagement with the respective protruding portions of the housing. An annular V-shaped groove (staking groove) formed in the other side of the outer race is then staked such that the spherical bearing is locked to the housing with a simplified structure while restraining the spherical bearing from turning relative to the housing. Moreover, the respective design of the shape of the flange of the outer race and the shape of the protruding portions of the housing can be made to a substantially high degree of freedom. This makes it possible to easily satisfy requirements for strength or efficiency of process. Unlike the lock structure of the spherical bearing as related art, the present invention requires no components for locking the spherical bearing to the housing, for example, a lock washer, a lock nut, a pin and the like. This makes it possible to realize simplified component control as well as improving efficiency of assembly. Moreover, as the flange of the outer race does not have to be extended in a radial direction for driving the pin thereinto, the size (weight) of material can be reduced, thus greatly reducing the cost.

According to the second aspect of the invention, the lock structure of the spherical bearing is provided with the protruding portions formed on a periphery of one side of the bearing hole of the housing, the flange formed on one side of the outer race, and the notches (engagement portions) formed in the flange mating with the respective protruding portions. The outer peripheral surface of the outer race of the spherical bearing is fitted into the bearing hole of the housing to bring the notches of the flange into engagement with the respective protruding portions of the housing. The annular V-shaped groove (staking groove) formed in the other side of the outer race is then staked such that the spherical bearing is locked to the housing. This makes it possible to reliably restrain the spherical bearing from turning relative to the housing. Moreover, the respective design of the shape of the flange of the outer race and the shape of the protruding portions of the housing can be made to a substantially high degree of freedom. This makes it possible to easily satisfy requirements for strength or efficiency of process. Unlike the lock structure of the spherical bearing as related art, the present invention requires no components for locking the spherical bearing to the housing, for example, the lock washer, the lock nut, the pin and the like. This makes it possible to realize simplified component control as well as improving efficiency of assembly. Moreover, as the flange of the outer race does not have to be extended in a radial direction for driving the pin thereinto, the size (weight) of material can be reduced, thus greatly reducing the cost.

What is claimed is:

1. A method of locking a spherical bearing having a spherical surface of an inner race slidably supported on an inner spherical surface of an outer race which is fitted into a bearing hole of a housing so as to be locked thereto, comprising:

a protruding portion formed on a periphery of one side of said bearing hole;

a flange formed on one side of said outer race;

an engagement portion formed in said flange to be brought into engagement with said protruding portion; and an annular staking groove formed in the other side of said outer race, wherein said engagement portion is brought into engagement with said protruding portion and said annular staking groove is staked so as to restrain said spherical bearing from turning relative to said housing.

* * * * *